United States Patent [19]

Iiyama et al.

[11] Patent Number: 5,889,127
[45] Date of Patent: Mar. 30, 1999

[54] CONTINUOUS PROCESS FOR THE PREPARATION OF A POLYESTER-BASED POLYMER

[75] Inventors: Takashi Iiyama, Himeji; Takashi Sato; Manabu Yamada, both of Ohtake, all of Japan

[73] Assignee: Daicel Chemical Industries, Ltd., Tokyo, Japan

[21] Appl. No.: 79,530

[22] Filed: May 15, 1998

[30] Foreign Application Priority Data

Nov. 18, 1997 [JP] Japan .................................. 9-333559

[51] Int. Cl.$^6$ ............................. C08F 2/00; C08G 63/06
[52] U.S. Cl. ........................... 526/64; 528/354; 528/355; 528/359; 528/361; 528/365; 524/366; 526/65; 526/66; 526/67; 526/68
[58] Field of Search ..................................... 528/354, 355, 528/359, 361, 365; 524/366; 526/64, 65, 66, 67, 68

[56] References Cited

U.S. PATENT DOCUMENTS

| 5,378,801 | 1/1995 | Reichert et al. | 528/354 |
| 5,468,837 | 11/1995 | Wautier | 528/357 |
| 5,484,882 | 1/1996 | Takada et al. | 528/361 |

*Primary Examiner*—Samuel A. Acquah
*Attorney, Agent, or Firm*—Morgan & Finnegan, LLP

[57] ABSTRACT

Disclosed is a process for the continuous preparation of a polyester-based polymer having excellent quality which is useful as materials for medical care, coatings, and wrapping. In the process for the continuous preparation, a column-type continuous reactor is essentially employed.

16 Claims, No Drawings

CONTINUOUS PROCESS FOR THE PREPARATION OF A POLYESTER-BASED POLYMER

FIELD OF THE INVENTION

The present invention relates to a continuous process for the preparation of a polyester-based polymer. In more detail, it relates to a continuous process for the preparation of polyester-based polymer which is a copolymer including polymers of lactones, lactides which are a bimolecular cyclized ester, ie., a dilactide (eg. lactide, 1,4-dioxa-3,6-dimethylcyclohexane-2,4-dione), a diglycolide (eg. glycolide, 1,4-dioxa-cyclohexane-2,5-dione), and a copolymer thereof.

In the preparation of the above-described polymers, because of a high viscosity in a reaction system, uniformly mixing becomes difficult, and there are occasionally caused thermal decomposition and discoloration, and there are occasionally caused deterioration in quality of a resulting polymer and decline in productivity by a high pressure loss. It relates to an excellent continuous process by which a polyester-based polymer can be industrially prepared, and by which the problems are solved. The polyester-based polymer is a useful resin in fields such as a bioabsorbable material for medical care, a material for medicines such as a capsule and agricultural chemicals, coating materials, wrapping materials such as sheets and films, and lamination materials.

BACKGROUND OF THE INVENTION

A polyester-based polymer such as a bimolecularly cyclized ester, e.g., dilactide and glycolide, a monomolecularly cyclized ester, e.g., lactone, and a copolymer thereof (hereinafter, referred to as "polyester-based polymer") are decomposed by light, heat, oxygen, and the like, and those are entered into a natural recirculation system. Therefore, many investigations have been recently conducted for the uses as a biodegradable polymeric material from the viewpoint of safeness and prevention of global environmental pollution.

As a process for the preparation of a homopolymer of dilactide or diglycolide which is a bimolecularly cyclized ester, there have been conventionally known preparation processes which are divided into two groups.

That is, one of the processes is a method for directly obtaining a polymer by dehydropolycondensation of the corresponding hydroxycarboxylic acids. The other is a method for obtaining a polymer by synthesis of a dehydrated cyclic ester of a hydroxy acid known as examples of dilactide and diglycolide, and then by the ring opening polymerization of the ester to obtain a polymer.

According to the former direct polycondensation method, it is difficult to obtain a polymer having a molecular weight of not less than 4,000 ("Lactic acid" in Veriag Chemie, page 226, 1971, which is written by C. H. Halten) and, even though an attempt is conducted for increasing the molecular weight by studies of the reaction conditions, the molecular weight is limited in approximately 20,000 at largest as shown in JP-B-02052930. In the case that there is required the preparation of a polymer having a higher molecular weight, there has been conventionally employed the latter method which is the ring opening polymerization of a cyclic esterified product.

Further, as a continuous process for the preparation of the lactides or lactones, a continuous process for the preparation of aromatic polyester and lactones is disclosed as "a continuous process for the preparation of an elastic polyester" in JP-A-61261124, JP-A-61283619, JP-A-61287922, JP-A-62020525, and JP-A-62027425 Official Gazettes and "a process for the preparation of an elastic polyester" in JP-A-02302433 and JP-A-02302434 Official Gazettes. In all the processes, there are equipped screw-type or paddle-type agitating blades such as a kneader or an extruder in an inside of a reaction vessel, and a reaction system is agitated by the agitating blades while the reactants are sequentially moved from an inlet for feeding raw materials to an outlet for a product.

Still further, as a continuous process for the preparation of the lactides, JP-A-05093050 Official Gazette discloses a so-called CSTR continuous preparation process in which a plurality of agitating vessels are connected in series each other, and raw materials for the reaction are continuously supplied, whereby, a continuous polymerization is conducted within a retention time of period which is a reaction period between initial reaction vessel and final reaction vessel.

However, in all the processes, there is employed a reaction apparatus equipped with a dynamic agitator, and the processes do not give a disclosure and suggestion concerning a solution to difficulty in uniform agitation and difficulty in heat removal caused by an elevation in the viscosity of the reactants through the continuous preparation of a biodegradable polyester-based polymer having a higher molecular weight from lactides or lactones.

That is, even though there are tried the continuous processes for the preparation of the lactides in the JPs or literature as described hereinabove, viscosity in the polymer elevates to a very high viscous region such as 10,000-several hundred of thousands poise with an increase of an average molecular weight in the polymer produced, resulting in that agitation by a usual agitator becomes difficult, and it becomes difficult to take out reactants. Also, even though a powerful agitator is employed, and a reaction system is agitated by employing agitation blades devised, the reactants move only in a substantially laminar flow according to the rotation of the agitation blades, resulting in that it becomes difficult to uniformly mix an inside of a reaction system as a whole.

In addition, since the ring-opening polymerization of cyclic esters exothermally proceeds, it becomes difficult to control a temperature in a reaction vessel by difficulty in uniform agitation because of an increase in viscosity, whereby, the reaction occasionally proceeds in an abnormal state, and temperature distribution is also caused in the reaction system, resulting in that deterioration in quality of a polymer is caused by being locally heated.

In recent years, in order to solve the problems, there has been employed (for example, U.S. Pat. No. 5,484,882) a static mixer (hereinafter, referred to as SMX) which does not have a movable part, that is, an agitator. However, flow resistance becomes very large because of a structure by which flow is repeatedly divided, converted, and reversed by unmovable mixing elements.

In other words, pressure loss becomes very large in a reaction system, and it becomes difficult to design a reaction vessel and pumps, etc. Moreover, decline in productivity is caused by an upper limit in discharging pressure.

In the case that the SMX is employed, there is possible only a most suitable design for a specified operation condition because of the absence of a movable part by which mixing, that is, shear rate is controlled, and mixing cannot be controlled in other operation conditions, that is, almost of operation conditions, resulting in that an operation cannot help being conducted while including inferiority in mixing and thermal distribution which always exceed a range. Further, in order to lower a higher pressure loss, in the case that there increases a diameter of the SMX, that is, area of a section through which a fluid passes, inferiority in mixing and thermal distribution become exceedingly large. Although the SMX is occasionally employed as a continuous reaction apparatus which is a recirculation style in order to avoid inferiority in mixing and thermal distribution, and a mixing effect is improved by repeatedly recirculating, there is enlarged a distribution of retention period in an inside of a reaction vessel, and there cannot be avoided deterioration of quality such as decomposition and discoloration in a polymer by a long time heating. Still further, because flow volume increases in a recirculating line, a plant becomes gigantic, plant costs become very expensive, and it is not practical.

Also, there is disclosed a process (eg. U.S. Pat. Nos. 5,378,801 and 5,468,837) in which an extruder is employed for polymerization of a polyester-based polymer. In the process, in the case that polymerization is conducted in an industrial scale, there is a problem that it is difficult to remove heat, resulting in that quality in a polymer becomes occasionally worse.

Particularly, the polyester-based polymer prepared from a cyclic ester has an excellent biodegradability. However, it is readily hydrolyzed by acids, alkalis, or water, and there is apt to be caused a decline in a molecular weight also by heating. For example, in GUPTA M. C., "Colloid Polymer Science", (Deu) 260 (3) 308–311, 1982, there is reported an investigation example of thermal decomposition rate in a homopolymer of dilactide by a thermogravimetric analysis. However, there is caused an accelerated decline in a molecular weight at high temperatures such as not less than 250° C. even in a hermetically sealed reaction vessel.

In addition, the homopolymer or copolymer of dilactide has a property that discoloration proceeds by being exposed to high temperature. That is, in the conventional process for the continuous polymerization of polymers from cyclic ester monomers, uniform mixing is prevented because of an increase of viscosity in the polymers caused by an increase of molecular weight, resulting in causing a problem that denaturation is partially caused by being locally heating, and quality is lowered.

Accordingly, setting aside a small scale experiment, there has been desired a more preferred process for an industrial mass production. It is a purpose of the present invention to provide a continuous process for the preparation of a polyester-based polymer having an excellent quality, by which there can be solved a difficulty in uniformly mixing caused by an increase of viscosity in reactants, a difficulty in removal of heat, and a decline in productivity by a high pressure loss, and which would become problematic in the case of industrially preparing the polyester-based polymer.

SUMMARY OF THE INVENTION

In view of the above background, and as a result of extensive investigation concerning a method for agitating and mixing a polyester-based polymer, and a method for decreasing pressure loss and, further, a continuous process for the preparation thereof, the inventors of this invention have now found that even reactants having a high viscosity can be excellently mixed, heat in polymerization can be effectively removed, and there can be obtained a polymer having a high molecular weight without discoloration and decomposition under a low pressure loss and a stabilized operation by employing a column-type continuous reactor (A), and the present invention has been completed.

A first aspect of the present invention relates to a continuous process for the preparation of a polyester-based polymer which comprises continuously feeding at least one lactone monomer into a column-type continuous reactor (A), and conducting ring-opening polymerization.

A second aspect of the present invention relates to a continuous process for the preparation of a polyester-based polymer which comprises continuously feeding at least one of an intermolecularly cyclized ester of a hydroxy carboxylic acid and at least one polymer having hydroxyl group and/or ester bond into a column-type continuous reactor (A), and conducting copolymerizing thereof.

DETAILED DESCRIPTION OF THE INVENTION

The present invention will be described hereinafter in more detail.

According to a first aspect of the present invention, there is provided a continuous process for the preparation of a polyester-based polymer which comprises continuously feeding at least one lactone monomer into a column-type continuous reactor (A), and conducting ring-opening polymerization.

According to a second aspect of the present invention, there is provided a continuous process for the preparation of a polyester-based polymer which comprises continuously feeding at least one bimolecular cyclized ester of a hydroxy carboxylic acid and at least one polymer having hydroxyl group and/or ester bond into a column-type continuous reactor (A), and conducting copolymerizing thereof.

First of all, the column-type continuous reactor (A) to be employed in the present invention is illustrated in detail.

The column-type continuous reactor (A) described in the present invention is a piston flow type column-type reactor which has an extruding flow property, which is different from a conventional agitating-style reactor which is a completely mixing type reaction vessel. More specifically, it is a reaction apparatus in which there is designed a piston flow property without a reversed flow, in other words, without a back flow mixing in a plurality of reactors which act as a completely mixing type vessel, respectively, and in which there are connected 2–100 pieces, preferably 10–60 pieces of vessels which correspond to the connecting number of a completely mixing vessel which is usually employed as an index of a piston flow property.

For the purpose of attaining the piston flow property without the reversed flow, there is preferred a column-type continuous reaction apparatus equipped with agitation blades.

Depending upon the kind of the column-type continuous reaction apparatus equipped with agitation blades, there is a reactor in which agitation blades themselves do not have a mechanism for transferring a fluid, and aim a completely mixing mechanism alone, or agitation blades themselves have a mechanism for mixing and transferring a liquid. Further, there are also a reactor having a jacket for heat transferring at an outside portion, a reactor having tubes or elements for heat transferring at an inside portion, and a reactor in which agitation blades themselves have tubes through which a heat transferring medium is flown. Still further, there are also a reactor in which an inside portion is mechanically separated by separating plates, etc., for the purpose of controlling corresponding vessel numbers, and a reactor devised only by the number and structure of agitating blades and a structure of reactor. In addition, depending upon the kind of the column-type continuous reaction apparatus equipped with agitation blades, there are also vertical type and horizontal type reactors.

In the preparation of the present polyester-based polymer having a thermally-decomposing property, since there is vigorously generated agitating heat by agitating shearing stress in a resin viscosity of more than 10,000 poise in addition to polymerization heat, in the case of a completely mixing type dynamic agitation, there is caused a deterioration in quality such as a decline in a molecular weight and discoloration by vigorously and locally heating. Further, in the case that a static mixer (SMX) is employed, because it is not able to control a shearing force, when there is conducted an operation even slightly apart from designed conditions, mixing becomes insufficient, resulting in that there is likewise caused a deterioration in quality. In order to avoid those, in the case that a plurality of static mixers are circularly connected to elevate efficiency in mixing, distribution becomes broad in a retention time of period, and there is likewise caused a deterioration in quality. Accordingly, in the preparation of the present polyester-based polymer having a thermally-decomposing property, there is particularly preferred a continuous column-type reactor (A) in which a shearing force, in other words, mixing can be controlled by rotation speed of agitation blades and, moreover, retention time of period is short owing to a piston flow property, and distribution is narrow in a retention time of period.

The column-type continuous reactor (A) is usually a column-state one. By connecting a plurality of column-type continuous reactors equipped with agitation blades in series, continuously feeding raw materials from an inlet under an inert gas atmosphere, and continuously transferring reactants through the reaction apparatuses, a reaction can be continuously conducted without quite coming in contact with outside atmosphere. As described hereinabove, there can be continuously conducted feeding of raw materials, a reaction, devolatilizing from a polymer, recovering unreacted monomers and/or solvents, and pelletizing the polymer. This is an advantage as being not attained in a conventional batchwise reaction apparatus, and is exceedingly suitable for preparing biodegradable polymers described in the present invention, which are decomposed by oxygen, moisture, and light.

Also, in the column-type continuous reactor (A) to be employed in the present invention, there can be controlled a temperature in an inside of a reactor by equipping a heat exchanger at an outside thereof, and by tubes and elements for heat exchanging equipped at an inside thereof. And also, it is able to substantially obtain a larger heat exchanging area by allowing to flow a medium through agitation blades themselves and, in addition, it is able to improve heat conductivity by controlling the rotation speed of agitation blades, resulting in that there can be most efficiently controlled a temperature of a reactor inside.

In the present invention in which the column-type continuous reactor (A) is employed, a variety of constructions can be selected by properties of polymers to be prepared.

That is, although a polymerization can be completely conducted only in the column-type continuous reactor (A), particularly, it is able to obtain a remarkable agitation effect by employing the column-type continuous reactor (A) in a latter reaction period in which there increases viscosity in a polymer.

In a stage of a relatively low viscosity of a polymer in an initial period of a reaction, the reaction is allowed to proceed in a usual agitation style reaction vessel equipped with an agitator, and then, the column-type continuous reactor (A) can be also employed in a stage of a high viscosity of a polymer in a latter period of the reaction at which polymerization proceeds.

More specifically, the polymerization is initiated in the agitation style reaction vessel equipped with an agitator by elevating an inside temperature (also referred to as a reaction temperature) of the reaction vessel to 180° C. or so which is a temperature in the vicinity of temperature in a polymerization reaction, followed by moving a polymerized solution to the column-type continuous reactor (A) to allow to further proceed the polymerization reaction. Catalysts are separately dissolved in a small amount of solvent at a low temperature, and then, may be preferably mixed with a starting monomer after elevated the temperature.

In the case that the starting monomer is transferred to the column-type continuous reactor (A) in a slightly polymerized state at an ordinary temperature, polymerization proceeds only at neighborhood of an inside wall in the reactor and, in the vicinity of a center portion in the reactor, polymerization does not proceed, resulting in that there quickly passes through an insufficiently polymerized solution in the vicinity of a center portion and residual monomer does not decrease.

Therefore, in the present invention, there can be also employed a continuous reaction apparatus composed of a reaction vessel equipped with an agitator and the column-type continuous reactor (A) connected to the reaction vessel. Further, for a monomer which causes a remarkably exothermal polymerization in spite of low viscosity in a polymer at an initial period of a polymerization, there is preferably employed a continuous reaction apparatus composed of a plurality of column-type continuous reactors (A) equipped with agitating blades, which are connected in series. Still further, polymerization is preferably conducted by a circulation style reaction apparatus (B) [hereinafter, an occasionally referred to as circulation style polymerization line or circulation style reaction apparatus] in which there are connected by pipe lines one or a plurality of column-type continuous reactors (A) equipped with agitating blades, and which are connected in series or by a parallel arrangement.

In other words, there are conducted the removal of heat from a polymerization solution and mixing in a polymerization zone at which a large amount of polymerization heat is generated by recirculating to a first inlet of the circulation style reaction apparatus without discharging the polymerization solution allowed to react in the column-type continuous reactors (A) equipped with agitating blades by only once-passing or once-through, and then, there is preferably employed a polymerization apparatus in which polymerization is conducted by the column-type continuous reactor (A) connected to a circulation style reaction apparatus.

Feeding rate of raw materials, in other words, a linear velocity of reactants is a parameter directly affecting mixing efficiency and heat-removal efficiency. Accordingly, it is selected according to a polymerization degree, viscosity, and a calorific value of a polymer to be prepared. However, since mixing and heat-removal effect can be controlled by controlling rotation speed of agitating blades, operation conditions can be widely selected. Rotation speed of agitating blades depends upon the presence or the absence of solvents. In the case that the solvent is not employed, it usually ranges from 1 to 30 rpm according to progress of polymerization and, in a high viscosity region, it ranges from 3 to 20 rpm, and preferably from 5 to 10 rpm. Particularly, in a polymerization of lactones in the absence of solvents, it most preferably ranges around 7–8 rpm in a high viscosity region.

Further, since some raw materials for polymerization to be employed in the present invention are biodegradable or hydrolyzable, there are thermally melted starting solid monomers and/or polymers having a lower melting point or softening point while streaming an inert gas such as nitrogen in order to prevent the decomposition of the raw materials for polymerization by oxygen or moisture, and then, other starting solid monomers and/or polymers having a higher melting point or softening point are dissolved into the melted starting monomers and/or polymers.

Otherwise, the starting monomers and/or polymers having a higher melting point or softening point are dissolved into a solvent, followed by feeding into the column-type continuous reactor (A).

In the present invention, the mass polymerization of polymerizable components composed of reactive monomers and/or polymers can be conducted in the absence of solvents in the column-type continuous reactor (A). However, the polymerization reaction can be also conducted in the presence of solvents by which an adverse affection is not caused for the purpose of controlling the viscosity of the reaction solution. In the case that the solvents are employed in the reaction system, because a viscosity is lowered in the reaction system, uniform mixing can be further attained owing to a decline of shear stress, resulting in that there can be reduced the number of the completely-agitating style reaction vessel, in other words, column length can be shortened. Also, there can be reduced the pressure for obtaining flow rate to be required for mixing, resulting in that there can be reduced pressure resistance to be designed in a whole reaction apparatus.

As the solvent to be mixed into the reaction system, there are preferred solvents which do not react with the starting monomers and/or polymers for polymerization and a produced polymer, and which can dissolve the starting monomers and/or polymers for polymerization and a produced polymer, and further which can be readily recovered and reused. As specific examples, there are preferably employed toluene, xylene, and ethylbenzene, etc.

The amount of the solvent to be employed in the reaction system preferably ranges in not more than 20 parts by weight based on 100 parts by weight of the polymerizable components composed of monomers and/or polymers which are raw materials for polymerization, and the maximum viscosity of the reaction solution during the entire reaction is preferably adjusted to not more than 50,000 poise. In the range of solvent content, the reaction rate is not greatly affected, and there is not lowered the molecular weight in a resulting polymer.

However, the amount of a solvent as described herein means the amount of a solvent in a steady state in the continuous reaction. In the initial stage of the continuous reaction according to the present invention, the amount of the solvent to be mixed in the reaction system preferably ranges in not less than 20 parts by weight based on 100 parts by weight of the polymerizable components composed of monomers and/or polymers which are raw materials for polymerization. The reaction system is diluted with the solvent before the initiation of the polymerization reaction and, thereafter, there are carefully and gradually raised the proportion of the polymerizable components composed of monomers and/or polymers which are raw materials for polymerization and the reaction temperature to initiate the polymerization reaction.

Accordingly, "the amount of a solvent not more than 20 parts by weight based on 100 parts by weight of the polymerizable components composed of monomers and/or polymers which are raw materials for polymerization" as described in the present invention means the amount of a solvent to be mixed into the reaction system in a steady continuous reaction state. The period at which the solvent is mixed may be at the stage of feeding of raw materials or, since the column-type continuous reactor (A) has an excellent mixing ability and the solvent is readily mixed with a solution having a high viscosity, it may be also mixed at a polymerization stage at which heat generation becomes remarkable for the purpose of cooling.

Further, the solvent may be mixed at the period at which the viscosity of the reaction solution exceedingly increases by a resulting polymer having a high molecular weight in a latter polymerization stage. Still further, in the case that the solvent is mixed at the period in the course of a reaction into the reaction system, starting monomers for polymerization and/or polymers may be dissolved in the solvent to be mixed. In addition, there may be mixed other additives, for example, a molecular weight modifier, a plasticizer, and an anti-oxidant into the reaction system after dissolving.

In the case that the solvent is mixed in the column-type continuous reactor (A), the pressure in the polymerization reaction system, though depending upon the kind of the monomers and/or polymers which are raw materials for polymerization, ranges generally in 2–15 kg/cm$^2$, and preferably not more than 10 kg/cm$^2$. Retention time (reaction time) in the polymerization reaction system generally ranges in 1–8 hours. In a terminating stage of the continuous reaction, the solvent proportion is gradually raised, and the reaction is terminated while discharging unreacted monomers and/or polymers which are raw materials for polymerization out of the continuous reaction system. In the stage, the solvent proportion is deviated from the range in the steady state and in the range of not more than 20 parts by weight.

Further, in the case that the reaction is conducted in the absence of solvents, the reaction temperature at an initial stage is predetermined at a low value, and a resulting polymer is circulated to an inlet for raw materials without discharging from the continuous reaction apparatus, whereby, the monomers and/or polymers which are raw materials for polymerization are circulated through the reaction apparatus several times and, the reaction temperature is gradually raised to conduct the polymerization reaction.

The percent conversion in the column-type continuous reactor (A) of the present invention is preferably not less than 85%, and unreacted monomer is recovered by a devolatilizer to employ again as raw materials.

The unreacted monomer recovered can be successively fed into a tank for feeding the starting materials, or can be once stored in a cushion tank, and then, can be also employed in the reaction after mixing with virgin starting monomers in the cushion tank.

Even though the percent conversion is less than 85%, the residual monomers have reactivity. If the monomers remain in a product polymer, those adversely affect the storage stability, and because the residual monomers and oligomers are unpreferred in view of safeness to human body and odor, those are preferably removed.

Therefore, in the present invention, a polyester-based polymer is polymerized in the column-type continuous reactor (A) in order to improve physical properties of polymeric materials in addition to the recovery and reuse of the unreacted monomer, followed by separating and recovering the residual monomers and oligomers, and solvents in a resulting polymer in the devolatilizer connected to the column-type continuous reactor (A). Solvents recovered are separated from the recovered monomers and oligomers, and optionally stored in a storage tank for reuse.

As a specific devolatilizing method, there is exemplified a method in which a resulting polymer after completion of the polymerization reaction is heated and melted in a preheater connected to the column-type continuous reactor (A) for the purpose of giving a sufficient fluidity to the polymer and supplying heat corresponding to evaporation latent heat of materials to be devolatilized.

The devolatilizer to be employed for practicing the present invention may be even a mere flush tank style one to conduct evaporation. Further, devolatilization can be conducted using a one-stage vertical type devolatilizer at a temperature at which monomers and solvents are evaporated. However, in the present invention, devolatilization is more preferably conducted by a combination of two-stages devolatilizing tanks.

That is, devolatilizatio is conducted at the vacuum degree of 20–150 mmHg in a first-stage devolatilizing tank, and then devolatilization is conducted in a higher vacuum degree, that is, at the vacuum degree of 1–20 mmHg in a second-stage volatilizing tank to separate and recover the unreacted monomers.

As a vacuum equipment, there can be employed a usual vacuum equipment, and a flush-style devolatilizer can be also employed and, moreover, a thin layer-style devolatilizer can be also employed. After devolatilizing, a resulting polymer after completion of the polymerization reaction is discharged from a bottom of the devolatilizer with a gear pump, and it can be also pelletized. Further, a polymer is extruded using a ventilation-type extruder as a plurality of polymer strands having diameter of 0.3–3 mm, and devolatilization can be also conducted by continuously feeding into the devolatilizer, and the polymer can be pelletized after optionally mixing additives using an extruder and a static mixer, etc. Also, unreacted monomers are recovered by cooling through a condenser, and can be fed into a reaction system together with virgin starting monomers. The unreacted monomers recovered are successively employed for the reaction by successively circulating to a reservoir tank for raw materials after reached to a steady state in a continuous reaction. Also, solvents separated and recovered are stored in a solvent tank after being cooled and recovered through the condenser, and those are optionally reused.

In the case that polymers are employed as raw materials for the reaction, the proportion of starting monomers to the starting polymers is preferably increased, and unreacted monomers are then preferably recovered and reused in order to prevent entering into resulting polymer.

In the present invention, the content of the residual monomers in the polyester-based polymer can be reduced to not more than 1% by successively using the devolatilizers.

Hereinafter, there are illustrated polymerizable components for the polyester-based polymer to be employed in the present invention.

A lactone to be employed in the present invention is a compound having a cyclic ester structure in the molecule which includes $\epsilon$-caprolactone, $\alpha,\alpha$-dimethyl-$\beta$-propiolactone, dodecanolactone, $\beta$-propiolactone, butyrolactone, valerolactone, 3-alkylvalerolactone, $\beta,\beta$-dialkylvalerolactone, a lactone of hydroxycyclohexane carboxylic acid, isocoumarine, coumarine, hydroxycoumarine, and a phthalide, etc. Of those, $\epsilon$-caprolactone is preferably employed.

The polyester-based polymer can be prepared by solely polymerizing by ring-opening the lactones, and the lactones may be also copolymerized with at least one of an intermolecularly cyclized ester of a hydroxycarboxylic acid. In the case, the polymerization ratio of the intermolecularly cyclized ester with respect to the lactones can vary depending upon a desired polymer, whereby, there can be provided polymers having preferred properties by widely selecting the combination of the intermolecularly cyclized ester with the lactones.

For example, a copolymer of dilactide with $\epsilon$-caprolactone or diglycolide is excellent in toughness and flexibility, and a film can be prepared without extending the copolymer. Further, a copolymer of dilactide with coumarine has an advantage of being excellent in thermal stability. In general, for the purpose of obtaining a transparent resin, the copolymer of dilactide is preferred. In the case, the polymerization molar ratio (mol number of dilactide/mol number of other monomers) of dilactide with respect to other monomers is preferably at least 1.

The bimolecularly cyclized ester of a hydroxycarboxylic acid to be employed in the present invention is a compound obtained by dehydration and intermolecular cyclic esterification of two mol of a hydroxycarboxylic acid. For example, there are exemplified diglycolide, dilactide, diethylglycolide, methylglycolide, $\alpha,\alpha$-dimethylglycolide, trimethylglycolide, and tetramethylglycolide which are the bimolecularly cyclized ester of lactic acid, glycolic acid, ethylglycolic acid, and dimethylglycolic acid, respectively, which is represented by formula (1),

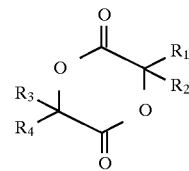

(in the formula, $R^1$, $R^2$, $R^3$, and $R^4$, which may be identical to or different from each other, are a hydrogen, methyl group, and ethyl group, respectively), L-dilactide and D-dilactide obtained by the cyclic esterification of L-lactic acid and D-lactic acid, respectively, DL-dilactide obtained by the cyclic esterification of two molecules of D,L-lactic acid, dilactides such as MESO-dilactide obtained by the cyclic esterification of one molecule of L-lactic acid and one molecule of D-lactic acid, and bimolecularly cyclized esters of a hydroxy acids such as $\alpha$-hydroxyacetic acid, $\alpha$-hydroxybutyric acid, $\alpha$-hydroxyvaleric acid, $\alpha$-hydroxyisovaleric acid, $\alpha$-hydroxycaproic acid, $\alpha$-hydroxyisocaproic acid, $\alpha$-hydroxy-$\beta$-methylbutyric acid, $\alpha$-hydroxyheptoic acid, $\alpha$-hydroxyoctoic acid, $\alpha$-hydroxydecanoic acid, $\alpha$-hydroxymyristic acid, and $\alpha$-hydroxystearic acid.

The bimolecularly cyclized ester to be employed in the present invention may be selected according to characteristics of a desired polymer. It may be employed solely or in combination of two or more kinds. For example, even though a dilactide is employed as a copolymer of dilactide with diglycolide, L-lactide or D-lactide alone should not be employed as a dilactide, but two or more selected from the group consisting of L-dilactide, D-dilactide, DL-dilactide, and MESO-dilactide should be rather employed in combination with a diglycolide to provide a further improvement in the resin characteristics such as moldability, transparency, and heat resistance from viewpoint of crystallinity of the resin.

In the present invention, the polyester-based polymer can be prepared by copolymerization of at least one of the bimolecularly cyclized esters with at least one of polymers having hydroxyl groups and/or ester bonds. The polymers having hydroxyl groups include polyvinyl alcohols, starches, cellulose, and a cellulose ester. In the case that these polymers are employed, a polymer close to a graft-based polymer is apt to be readily obtained, and polymer close to a block-based polymer is apt to be readily obtained from polyoxyalkylene ethers.

Further, as the polymers having ester bonds, there are exemplified a polyvinyl acetate, a copolymer of vinyl acetate/ethylene, and a polycarbonate, and as the polymers having hydroxyl groups and ester bonds, there are exemplified a cellulose ester and a polyester.

In the present invention, at least one of the polymers or a mixture thereof can be employed without any limitation, and there are preferred polymers having a relatively larger molecular weight, specifically, a weight-average molecular weight of 3,000–300,000, and preferably weight-average molecular weight of 5,000–20,000 and a melting point of not more than 200° C. Further, from the viewpoint of compatibility, there are preferred cellulose esters having hydroxyl groups esterified in a proportion of 43–65%. Still further, in the copolymer of vinyl acetate/ethylene, the molar ratio of vinyl acetate/ethylene is preferably not less than 60/40. Also, in the polyesters, there are preferably employed those having a melting point of not more than 200° C. and a molecular weight of not less than 10,000.

Although there is complicated a reaction mechanism of the copolymerization of the bimolecularly cyclized esters with at least one of polymers having hydroxyl groups and/or ester bonds, it is supposed that the ring-opening polymerization of the cyclic esters prevails in the initial reaction stage and, after the preparation of an oligomer of the cyclic esters, there proceeds a transesterification of the cyclic esters with a polymer having hydroxyl groups and/or ester bonds to produce a copolymer.

Further, in the case that dilactide is employed as a cyclic ester in a copolymerization ratio of 1 or more, a transparent resin can be obtained.

As catalysts for polymerization to be employed in the present invention, there are exemplified a titanium-based compound such as titanium chloride, tetrabutyl titanate, tetrapropyl titanate, and tetraethyl titanate, a tin-based compound such as stannous chloride, stannous bromide, stannous iodide, and tin 2-ethylhexanoate, a zinc compound such as zinc chloride, zinc acetate, zinc stearate, zinc oxide, zinc carbonate, basic zinc carbonate, and diethyl zinc, aluminum compounds, magnesium compounds, barium compounds, zirconium compounds, and germanium compounds, etc. The catalysts for polymerization may be employed solely or in combination, and the amount is usually a range of 0.001–1.0%, and preferably 0.01–0.1%.

The ratio of the copolymerizable components in the present invention varies depending upon characteristics to be required in a desired copolymer.

In the copolymerization of the bimolecularly cyclized esters (X) and the lactones (Y), molar ratio of X/Y is 99/1–1/99, preferably 98/2–50/50, and more preferably 95/5–75/25.

Further, in the copolymerization of dilactide (X) and the diglycolide (Y), molar ratio of X/Y is 99/1–1/99, preferably 98/2–50/50, and more preferably 95/5–75/25.

Still further, in the copolymerization of the bimolecularly cyclized ester (X) and the polymers (Z) having hydroxyl groups and/or ester bonds, molar ratio of X/Z is 99/1–1/99, preferably 98/2–50/50, and more preferably 95/5–75/25.

In the copolymer of the bimolecularly cyclized ester (X) and the lactones (Y), melt viscosity depends upon a weight-average molecular weight and a composing ratio of (X)/(Y) in a resulting polymer. Usually, in the resulting polymer having a weight-average molecular weight of 20,000–80,000, melt viscosity at 180° C. is 5,000–50,000, and in the resulting polymer having a weight-average molecular weight of 80,000–500,000, melt viscosity is 20,000–200,000, and in the melt viscosity of the resulting polymer, there is shown a tendency of lowering with an increase of a composing ratio of the lactones (Y).

The retention time (reaction time), during which dilactides as the bimolecularly cyclized ester is allowed to react with the lactones (Y) by the column-type continuous reactor (A) in a reaction yield of 85%, is different depending upon the kind of the lactones (Y). In the case of obtaining a resulting polymer having a weight-average molecular weight of 20,000–80,000, the reaction is conducted at a temperature of 150°–185° C. for 2–8 hours, and at a maximum reaction pressure in the system of 2–10 kg/cm$^2$ and, in the case of obtaining a resulting polymer having a weight-average molecular weight of 80,000–500,000, reaction is conducted at a temperature of 150°–185° C. for 3–10 hours, and at a maximum reaction pressure in the system of 3–15 kg/cm$^2$.

The retention time (reaction time), during which diglycolides (X) as the bimolecularly cyclized ester is allowed to react with lactones (Y) by the column-type continuous reactor (A) in a reaction yield of 85%, is different depending upon the kind of the lactones (Y). In the case of obtaining a resulting polymer having a weight-average molecular weight of 20,000–80,000, reaction is conducted at a temperature of 155°–230° C. for 2–8 hours, and at a maximum reaction pressure in the system of 2–10 kg/cm$^2$ and, in the case of obtaining a resulting polymer having a weight-average molecular weight of 80,000–500,000, reaction is conducted at a temperature of 155°–230° C. for 3–10 hours, and at a maximum reaction pressure in the system of 3–15 kg/cm$^2$.

The reaction temperature in the polymerization reaction according to the present invention is different depending upon properties of the bimolecularly cyclized esters, lactones, and the polymers having hydroxyl groups and/or ester bonds to be employed and the combination thereof. Usually, it is 120°–200° C., for example, in the case that the bimolecularly cyclized ester (X) is dilactide, methylglycolide, or ethylglycolide, the temperature in the reaction with the lactones (Y) is usually 125°–200° C., preferably 145°–195° C., and more preferably 150°–185° C.

Further, in the case that the bimolecularly cyclized ester (X) is diglycolide, α,α-dimethylglycolide, trimethylglycolide, or tetramethylglycolide, temperature in the reaction with the lactones (Y) is usually 125°–270° C., preferably 145°–260° C., and more preferably 155°–230° C. Still further, the temperature in the reaction of dilactide with diglycolide is usually 125°–270° C., Preferably 145°–260° C., and more preferably 155°–230° C.

Melt viscosity in a copolymer of dilactide with diglycolide depends upon the composing ratio of the two compounds and a weight-average molecular weight of a resulting copolymer.

Usually, melt viscosity at 180° C. is 5,000–50,000 poise in the resulting copolymer having a weight-average molecular weight of 20,000–80,000, and melt viscosity at 180° C. is 20,000–200,000 poise in the resulting copolymer having a weight-average molecular weight of 80,000–500,000, and in the melt viscosity of the resulting copolymer, there is shown a tendency of lowering with an increase of the composing ratio of diglycolide.

As the retention time (reaction time) during which dilactides is allowed to react with diglycolides by a continuous reaction in a reaction yield of 85%, in the case of obtaining a resulting polymer having a weight-average molecular weight of 20,000–80,000, it is usually 2–8 hours at a temperature of 155°–230° C., and a maximum reaction pressure in the system is 2–10 kg/cm$^2$ and, in the case of obtaining a resulting polymer having a weight-average molecular weight of 80,000–500,000, it is usually 3–10 hours at a temperature of 155°–230° C., and a maximum reaction pressure in the system is 3–15 kg/cm$^2$.

Reaction temperature in the copolymerization reaction of at least one lactones is usually 125°–290° C., preferably 145°–280° C., and more preferably 155°–250° C. Melt viscosity in a copolymerized polymer composed of at least one lactones depends upon the kind of composing lactones and a weight-average molecular weight of a resulting polymer.

Usually, melt viscosity at 180° C. is 2,000–20,000 poise in the resulting copolymer having a weight-average molecular weight of 10,000–80,000, and melt viscosity at 180° C. is 5,000–100,000 poise in the resulting copolymer having a weight-average molecular weight of 80,000–500,000.

As the retention time (reaction time) in the case of allowing to react at least one lactones by a continuous reaction in a reaction yield of 85%, in the case of obtaining a resulting polymer having a weight-average molecular weight of 20,000–80,000, it is usually 2–8 hours at a temperature of 155°–250° C., and a maximum reaction pressure in the system is 2–10 kg/cm$^2$ and, in the case of obtaining a resulting polymer having a weight-average molecular weight of 80,000–500,000, it is usually 3–10 hours at a temperature of 155°–250° C., and a maximum reaction pressure in the system is 3–15 kg/cm$^2$.

As reaction temperature in the copolymerization reaction of the bimolecularly cyclized ester (X) with the polymer (Z) having hydroxyl groups and/or ester bonds, in the case that the bimolecularly cyclized ester (X) is dilactide, methylglycolide, ethylglycolide, diglycolide, α,α-dimethylglycolide, trimethylglycolide, or tetramethylglycolide, and the polymer (Z) having hydroxyl groups and/or ester bonds is a cellulose ester, a cellulose ether, or a polyoxyalkylene ether, it is usually 125°–200° C., preferably 145°–195° C., and more preferably 150°–180° C.

Further, in the case that the bimolecularly cyclized ester (X) is dilactide, methylglycolide, or ethylglycolide, and the polymer (Z) having hydroxyl groups and/or ester bonds is a cellulose, a polyvinyl alcohol, a polyvinyl acetate, a vinyl acetate/ethylene copolymer, an aromatic polyester, an aliphatic polyester, or a polycarbonate, it is usually 125°–200° C., preferably 145°–195° C., and more preferably 150°–185° C. Still further, in the case that the bimolecularly cyclized ester (X) is diglycolide, α,α-dimethylglycolide, trimethylglycolide, or tetramethylglycolide, and the polymer (Z) having hydroxyl groups and/or ester bonds is a cellulose, a polyvinyl alcohol, a polyvinyl acetate, a vinyl acetate/ethylene copolymer, an aromatic polyester, an aliphatic polyester, or a polycarbonate, it is usually 125°–270° C., preferably 145°–260° C., and more preferably 155°–230° C.

Melt viscosity in a copolymer of the bimolecularly cyclized ester (X) with the polymer (Z) having hydroxyl groups and/or ester bonds depends upon a weight-average molecular weight of a resulting copolymer and the composing ratio of the (X) to the (Z). In the case that there is employed the polymer (Z) having a weight-average molecular weight of not less than 10,000 and melt viscosity at 180° C. of not less than 10,000, melt viscosity at 180° C. becomes usually 5,000–50,000 in a resulting polymer having a weight-average molecular weight of 20,000–80,000, and melt viscosity at 180° C. becomes usually 20,000–200,000 poise in a resulting polymer having a weight-average molecular weight of 80,000–500,000.

As the retention time (reaction time) in the case of allowing to react dilactides which are the bimolecularly cyclized ester (X) with the polymer (Z) having hydroxyl groups and/or ester bonds by a continuous reaction in a reaction yield of 85%, in the case of obtaining a resulting polymer having a weight-average molecular weight of 20,000–80,000, it is usually 2–8 hours at a temperature of 155°–185° C., and a maximum reaction pressure in the system is 2–10 kg/cm$^2$ and, in the case of obtaining a resulting polymer having a weight-average molecular weight of 80,000–500,000, it is usually 3–10 hours at a temperature of 150°–185° C., and a maximum reaction pressure in the system is 3–15 kg/cm$^2$.

As the retention time (reaction time) in the case of allowing to react the diglycolides which are the bimolecularly cyclized ester (X) with the polymer (Z) having hydroxyl groups and/or ester bonds by a continuous reaction in a reaction yield of 85%, in the case of obtaining a resulting polymer having a weight-average molecular weight of 20,000–80,000, it is usually 2–8 hours at a temperature of 155°–230° C., and a maximum reaction pressure in the system is 2–10 kg/cm$^2$ and, in the case of obtaining a resulting polymer having a weight-average molecular weight of 80,000–500,000, it is usually 3–10 hours at a temperature of 155°–230° C., and a maximum reaction pressure in the system is 3–15 kg/cm$^2$.

The above-described maximum reaction pressure in the system is that in reaction conditions of the absence of solvents. In the case that solvents are employed in the reaction system, and viscosity in the reaction system is adjusted to not more than 60,000 poise, there can be further lowered the above-described maximum reaction pressure in the system. It is usually not more than 10 kg/cm$^2$, and the maximum reaction pressure of 2–15 kg/cm$^2$ is preferably selected as designed conditions in the reaction apparatus in view of safeness.

In the present invention, there can be also employed a molecular weight modifier (a chain transfer agent) such as water, lactic acid, glycolic acid, and other alcohols or carboxylic acids in an amount of 0.1% at most according to purposes to obtain a polymer having a low molecular weight. Further, in the present invention, there can be added other additives usually employed for polymers such as an anti-oxidant, an ultraviolet ray absorbent, and a plasticizer without any limitations. The additives can be added into the reaction system by dissolving in solvents during the reaction. Still further, during the continuous reaction in the present invention, there can be further optionally added isocyanates, acid anhydrides, and compounds having an epoxy group, etc. in addition to the above-mentioned copolymerizable components in order to improve physical properties of resulting polymers.

As described in detail hereinabove, the present invention provides a continuous process for the preparation of a polyester-based polymer having melt viscosity of not more than 500,000 and a weight-average molecular weight of not less than 10,000. In the continuous process, there are continuously supplied monomers or polymers selected from the group consisting of a bimolecularly cyclized ester of a hydroxy carboxylic acid, a lactone, and a polymer having hydroxyl groups and/or ester bonds, and then, those can be allowed to continuously react in the presence or absence of solvents in the state of the complete absence of oxygen and water in the atmosphere at polymerization reaction temperature of 125°–270° C., pressure in a reaction system of 2–15 kg/cm$^2$, and in a reaction ratio of not less than 85% by one-through. Residual monomers and solvents are recovered by devolatilizing, and reused.

Hereinafter, although the present invention is specifically illustrated by Examples and Comparative Examples, the present invention is not limited by those. It is to be noted that all the terminologies "%" and "part" represent "% by weight" and "part by weight", so far as not particularly described.

EXAMPLE 1

In the Example, as the column-type continuous reactor (A), there was employed a continuous polymerization apparatus in which there are connected in series 4 units of a column-type continuous reactor (a corresponding vessel number=20) equipped with agitating blades having internal diameter of ½ inch and the length of 50 cm and 4 units of a column-type continuous reactor (a corresponding vessel number=15) equipped with agitating blades having internal diameter of ¾ inch and the length of 50 cm, respectively.

Catalyst was mixed with main raw materials through a static mixer having internal diameter of ¼ inch and the length of 15.5 cm, at a place immediately before a pump for supplying the main raw materials. Into a tank for supplying the main raw materials, 95 parts of L-dilactide and 5 parts of ε-caprolactone were added, followed by heating under a nitrogen atmosphere to dissolve L-dilactide. As the catalyst, 0.02 part of tin 2-ethylhexanoate was employed. Bulk polymerization was conducted by continuously feeding the main raw materials at a feeding rate of 250 ml/hour (specific gravity=1) and the catalyst at feeding rate of 0.5 ml/hour (specific gravity=1), and at a reaction temperature of 165° C. Polymer obtained was pelletized, and a variety of physical properties were measured. Results in measurements are shown in Table 1.

EXAMPLE 2

The polymerization was conducted likewise in the Example 1 except that 85 parts of L-dilactide, 15 parts of ε-caprolactone, and 0.03 part of stannous chloride which is a catalyst were mixed under an atmosphere of nitrogen gas to prepare a solution of main raw materials. Resin obtained was pelletized, and a variety of physical properties were measured. Results in measurements are shown in Table 1.

EXAMPLE 3

The polymerization was conducted likewise in the Example 1 except that 90 parts of L-dilactide, 10 parts of coumarine, and 0.03 part of stannous chloride which is a catalyst were mixed under an atmosphere of nitrogen gas to prepare a solution of main raw materials. Resin obtained was pelletized, and a variety of physical properties were measured. Results in measurements are shown in Table 1.

EXAMPLE 4

As the column-type continuous reactor (A), there was employed a polymerization apparatus having a polymerization zone composed of a circulating polymerization line in which there are connected in series 4 units of a column-type continuous reactor equipped with agitating blades having internal diameter of 0.5 inch and the length of 50 cm, a circulating polymerization line in which there are connected 4 units of a column-type continuous reactor (a corresponding vessel number=15) equipped with agitating blades having internal diameter of ¾ inch and the length of 50 cm and a gear pump, and a polymerization line connected thereto.

There was employed a solution prepared under a nitrogen atmosphere which contains main raw materials composed of 85 parts of L-dilactide, 5 parts of D-dilactide, and 10 parts of an aliphatic polyester resin (a weight-average molecular weight of 70,000) prepared from succinic acid and ethyleneglycol, and 0.04 part of tetraisopropyl titanate which is a catalyst.

Polymerization was conducted by feeding the main raw materials at a feeding rate of 400 ml/hour and the catalyst at feeding rate of 1.6 ml/hour, at a reaction temperature of 175° C., at a circulating flow amount of 2 liter/hour to the circulating polymerization line, and a recirculating proportion of 5.

Polymer obtained was likewise pelletized as in Example 1, and a variety of physical properties were measured. Results in measurements are shown in Table 1.

EXAMPLE 5

There was employed a continuous polymerization apparatus in which it is connected so that a polymerization solution in a first polymerization vessel equipped with an anchor-type agitating blades can be continuously transferred from a bottom of the vessel to the column-type continuous reactor (A) as in Example 1 with a gear pump.

There was employed a solution prepared under a nitrogen atmosphere which contains main raw materials composed of 85 parts of L-dilactide, 5 parts of MESO-dilactide, and 10 parts of a polyethylenephthalate (a weight-average molecular weight of 6,000 and a melting point of 85° C.), and 0.03 part of tin 2-ethylhexanoate which is a catalyst.

Polymerization was conducted under conditions of feeding the main raw materials at a feeding rate of 500 ml/hour, and the catalyst at feeding rate of 1.5 ml/hour, at retention amount in the first polymerization vessel of 500 ml, at a reaction temperature in the first polymerization vessel of 160° C., at a supplying rate of 500 ml/hour to the column-type continuous reactor (A), and at a reaction temperature in the column-type continuous reactor (A) of 175° C. Resin obtained was likewise pelletized as in Example 1, and a variety of physical properties were measured. Results in measurements are shown in Table 1.

EXAMPLE 6

Polymerization was conducted by the polymerization conditions as in Example 5, except that there was employed a solution prepared under a nitrogen atmosphere which contains main raw materials composed of 15 parts of toluene, 79 parts of L-dilactide, 2 parts of D-dilactide, and 4 parts of a polyester resin (a weight-average molecular weight of 30,000) composed of terephthalic acid, isophthalic acid, adipic acid, ethyleneglycol, and neopentyl glycol. Subsequently, a resulting polymerization solution was devolatilized through an apparatus composed of a heat exchanger and a devolatilizing tank, etc. Temperature of the heat exchanger before the devolatilizing tank was 200° C., and vacuum degree was 10 Torr in the devolatilizing tank. Resin obtained was pelletized, and a variety of physical properties were measured. Results in measurements are shown in Table 1.

EXAMPLE 7

The polymerization was conducted likewise in the Example 1 except that there was employed a solution containing main raw materials prepared under nitrogen atmosphere composed of 90 parts of L-dilactide and 10 parts of a polyethylene glycol (a weight-average molecular weight of 200,000). Polymer obtained was pelletized, and a variety of physical properties were measured.

Results in measurements are shown in Table 1.

EXAMPLE 8

The polymerization was conducted likewise in the Example 1 except that there was employed a solution containing main raw materials prepared under nitrogen atmosphere composed of 100 parts of ε-caprolactone, 0.05 part of ethyleneglycol, and 0.01 part of monobutyl-tris-(tin 2-ethylhexanoate) which is a catalyst, under the conditions of feeding the main raw materials at a feeding rate of 150 ml/hour (specific gravity=1), and the catalyst at a feeding rate of 0.09 ml/hour (specific gravity=1), at a reaction temperature of 160° C. Polymer obtained was pelletized, and a variety of physical properties were measured. Results in measurements are shown in Table 1.

EXAMPLE 9

The polymerization was conducted likewise in the Example 1 except that there was employed a solution containing main raw materials prepared under nitrogen atmosphere composed of 100 parts of ε-caprolactone, 0.06 part of 1,6-hexanediol, and 0.02 part of monobutyl-tris-(tin 2-ethylhexanoate) which is a catalyst, under the conditions of feeding the main raw materials at a feeding rate of 250 ml/hour (specific gravity=1), and the catalyst at a feeding rate of 0.2 ml/hour (specific gravity=1), at a reaction temperature of 170° C. Polymer obtained was pelletized, and a variety of physical properties were measured.

Results in measurements are shown in Table 1.

EXAMPLE 10

The polymerization was conducted likewise in the Example 1 except that there was employed a solution containing main raw materials prepared under nitrogen atmosphere composed of 90 parts of ε-caprolactone, 10 parts of δ-valerolactone, and tin 2-ethylhexanoate which is a catalyst. Polymer obtained was pelletized, and a variety of physical properties were measured.

Results in measurements are shown in Table 1.

EXAMPLE 11

In the Example, as the column-type continuous reactor (A), there was employed a continuous polymerization apparatus in which there are connected in series 4 units of a column-type continuous reactor (a corresponding vessel number=20) equipped with agitating blades having internal diameter of ½ inch and the length of 60 cm and 4 units of a column-type continuous reactor (a corresponding vessel number=15) equipped with agitating blades having internal diameter of ¾ inch and the length of 50 cm, respectively.

Catalyst was mixed with main raw materials through a static mixer having internal diameter of ¼ inch and the length of 15.5 cm at a place immediately before a pump for feeding the main raw materials using a pump for feeding a catalyst.

Polymerization was conducted by employing a solution prepared under a nitrogen atmosphere which contains main raw materials composed of 15 parts of toluene, 79 parts of L-dilactide, 2 parts of D-dilactide, and 4 parts of a polyester resin (a weight-average molecular weight of 30,000) composed of terephthalic acid, isophthalic acid, adipic acid, ethyleneglycol, and neopentyl glycol, and 0.02 part of tin 2-ethylhexanoate which is a catalyst, under the conditions for feeding the main raw materials at a feeding rate of 250 ml/hour, and the catalyst at feeding rate of 0.8 ml/hour, at a reaction temperature of 185° C.

After the polymerization, a resulting polymerization solution was devolatilized through an apparatus composed of a heat exchanger and a devolatilizing tank, etc. Temperature of the heat exchanger before the devolatilizing tank was 205° C., and vacuum degree was 9 Torr in the devolatilizing tank. Resin obtained was pelletized, and a variety of physical properties were measured. Results in measurements are shown in Table 1.

COMPARATIVE EXAMPLE 1

Polymerization reaction was conducted by employing a reaction vessel equipped with a helical-type agitating blades.

After polymerized for 6 hours with the same solution contains main raw materials and at the same temperature as in Example 1, resulting polymers were taken out of respective portions in the reaction vessel as samples, and a variety of physical properties were measured. Results in measurements are shown in Table 2.

COMPARATIVE EXAMPLE 2

Polymerization reaction was conducted by changing from helical-type agitating blades employed in the Comparative Example 1 to an anchor-type agitating blades. After polymerized for 6 hours with the same solution contains main raw materials and at the same temperature as in Example 2, resulting polymers were taken out of respective portions in the reaction vessel as samples, and a variety of physical properties were measured.

Results in measurements are shown in Table 2.

TABLE 1

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Outer appearance | | | | | | | | | | | |
| Color | colorless | colorless | colorless | colorless | colorless | colorless | colorless | white | colorless | white | white |
| Transparency | transparent | transparent | transparent | transparent | transparent | transparent | transparent | opaque | transparent | opaque | opaque |
| Residual monomer (%) | 6.8 | 5.1 | 6.8 | 4.6 | 2.8 | 0.5 | 11.6 | 1.4 | 3.2 | 0.5 | 1 |
| Number average molecular weight (× 1000) | 152 | 93 | 160 | 90 | 104 | 99 | 76 | 45 | 104 | 62 | 98 |
| Weight average molecular weight (× 1000) | 255 | 188 | 284 | 162 | 220 | 178 | 142 | 82 | 170 | 99 | 157 |
| Melting point (°C.) | 162 | 148 | 165 | 166 | 172 | 168 | 164 | 52 | 165 | 63 | 63 |
| Viscosity (× 1000 poise)*1 | 46 | 43 | 46 | 42 | 53 | 56 | 25 | 10 | 47 | 25 | 224 |

TABLE 2

| | Comparative Example | | | | | |
|---|---|---|---|---|---|---|
| | 1 | | | 2 | | |
| | A | B | C | A | B | C |
| Outer appearance | | | | | | |
| Color | colorless | yellowish | colorless | yellowish | yellowish | colorless |
| Transparency | transparent | transparent | transparent | transparent | slightly opaque | transparent |
| Residual monomer (%) | 5.3 | 4.0 | 3.1 | 10.2 | 3.5 | 3.0 |
| Number average molecular weight (× 1000) | 114 | 105 | 123 | 77 | 72 | 95 |
| Weight average molecular weight (× 1000) | 205 | 175 | 244 | 152 | 137 | 197 |
| Melting point (%) | 165 | 175 | 152 | 160 | 167 | 168 |

*1: Viscosity shows melt viscosity at 180° C.

In the Tables 1 and 2, Residual monomer (%), Number average molecular weight, and Weight average molecular weight are based on a measurement with a GPC, and Melting point is based on a measurement by a differential thermal analysis method (DSC).

In the Table 2, Zones A, B, and C in Comparative Examples mean the use of polymer samples taken out of a upper portion (A), a middle portion (B), and a lower portion (C) in the reaction vessel, respectively.

It is identified that in the Examples according to the present invention, there were continuously obtained the polymers having an exceedingly excellent homogeneity and, contrarily, in the Comparative Examples, physical properties in the polymers obtained remarkably fluctuate even in an inside of the same reaction vessel.

By the present invention, there can be solved a difficulty of uniformly mixing caused by high viscosity of reactants in the preparation of a polyester-based polymer having a high molecular weight by ring-opening polymerization and a difficulty of heat removal, whereby, there can be provided a process for the continuous preparation of a polyester-based polymer having excellent quality which is useful as materials for medical care, coatings, and wrapping.

While the invention has been described in detail and with reference to specific embodiments thereof, it will be apparent to one skilled in the art that various changes and modifications can be made therein without departing from the spirit and scope thereof.

What is claimed is:

1. A continuous process for the preparation of a polyester-based polymer which comprises continuously feeding at least one lactone monomer into a column-type continuous reactor (A), and conducting ring-opening polymerization.

2. A continuous process for the preparation of a polyester-based polymer as claimed in claim 1, wherein there is mixed not more than 20 parts by weight of solvents not having an active hydrogen based on 100 parts by weight of said lactone monomer.

3. A continuous process for the preparation of a polyester-based polymer as claimed in claim 1, wherein polymerization reaction is further allowed to proceed by feeding into said column-type continuous reactor (A) after prepolymerizing said lactone monomer in an agitation-type reactor having an agitator.

4. A continuous process for the preparation of a polyester-based polymer as claimed in any one of claims 1–3, wherein polymerization is conducted by circulating reactants through a circulation style reaction apparatus (B) including said column-type continuous reactor (A).

5. A continuous process for the preparation of a polyester-based polymer as claimed in claim 1, wherein raw materials for polymerization are fed into said column-type continuous reactor (A) after melting or dissolving into solvents thereof under an inert gas atmosphere.

6. A continuous process for the preparation of a polyester-based polymer as claimed in any one of claims 1–3, wherein polymerization is conducted by removing and recovering residual lactone monomers and/or said solvents in a degassing equipment connected to said column-type continuous reactor (A) after allowing to polymerize raw materials for polymerization in said column-type continuous reactor (A), followed by reemploying thereof.

7. A continuous process for the preparation of a polyester-based polymer as claimed in claim 1, wherein said lactone monomer is ε-caprolactone.

8. A continuous process for the preparation of a polyester-based polymer which comprises continuously feeding at least one of an intermolecularly cyclized ester of a hydroxy carboxylic acid and at least one polymer having hydroxyl group and/or ester bond into a column-type continuous reactor (A), and conducting copolymerizing thereof.

9. A continuous process for the preparation of a polyester-based polymer as claimed in claim 8, wherein there is mixed not more than 20 parts by weight of solvents not having an active hydrogen based on 100 parts by weight of said intermolecularly cyclized ester of a hydroxy carboxylic acid and said polymer having hydroxyl group and/or ester bond.

10. A continuous process for the preparation of a polyester-based polymer as claimed in claim 9, wherein said intermolecularly cyclized ester of a hydroxy carboxylic acid is dilactide and/or diglycolide.

11. A continuous process for the preparation of a polyester-based polymer as claimed in claims 8–10, wherein polymerization is further allowed to proceed by feeding into said column-type continuous reactor (A) after prepolymerizing said lactone monomer in an agitation-type reactor having an agitator.

12. A continuous process for the preparation of a polyester-based polymer as claimed in any one of claims 8–10, wherein polymerization is conducted by circulating reactants through a circulation style reaction apparatus (B) including said column-type continuous reactor (A).

13. A continuous process for the preparation of a polyester-based polymer as claimed in any one of claims 8–10, wherein raw materials for polymerization are fed into said column-type continuous reactor (A) after melting or dissolving into solvents thereof under an inert gas atmosphere.

14. A continuous process for the preparation of a polyester-based polymer as claimed in any one of claims 8–10, wherein polymerization is conducted by removing and recovering residual lactone monomers and/or said solvents in a degassing equipment connected to said column-type continuous reactor (A) after allowing to polymerize raw materials for polymerization in said column-type continuous reactor (A), followed by reemploying thereof.

15. A continuous process for the preparation of a polyester-based polymer as claimed in claim 1 or 8, wherein said column-type continuous reactor (A) is equipped with an agitator.

16. A continuous process for the preparation of a polyester-based polymer as claimed in claim 3, wherein polymerization is further allowed to proceed in said column-type continuous reactor (A) after initiation of polymerization by elevating a temperature inside a reaction vessel to a polymerization reaction temperature in said agitation-type reactor having an agitator.

* * * * *